US008028225B2

(12) United States Patent  
Zare et al.

(10) Patent No.: US 8,028,225 B2
(45) Date of Patent: Sep. 27, 2011

(54) VISUAL SYSTEM FOR VISUALIZING, NAVIGATING, AND EDITING ATTRIBUTE LATTICES WITHIN OLAP DATABASES

(75) Inventors: Robert B. Zare, Issaquah, WA (US); Adrian Dumitrascu, Redmond, WA (US); Aleksandar Juric, Redmond, WA (US); Maria Potapova, Kenmore, WA (US); Matthew E. Carroll, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 979 days.

(21) Appl. No.: 11/943,601

(22) Filed: Nov. 21, 2007

(65) Prior Publication Data

US 2009/0132903 A1    May 21, 2009

(51) Int. Cl.
*G06F 17/00*    (2006.01)
(52) U.S. Cl. ...................................................... 715/200
(58) Field of Classification Search .................. 715/200, 715/255, 211
See application file for complete search history.

(56) References Cited

U.S. PATENT DOCUMENTS

| | | | | |
|---|---|---|---|---|
| 5,632,022 | A * | 5/1997 | Warren et al. .................. | 715/776 |
| 5,684,715 | A * | 11/1997 | Palmer .......................... | 348/473 |
| 5,835,922 | A * | 11/1998 | Shima et al. ................... | 715/209 |
| 5,897,670 | A * | 4/1999 | Nielsen .......................... | 715/866 |
| 6,484,214 | B1 * | 11/2002 | Sundermier ................... | 719/332 |
| 7,010,518 | B1 | 3/2006 | Bedell et al. | |
| 7,092,959 | B2 * | 8/2006 | Chen et al. ........................ | 1/1 |
| 7,158,992 | B2 | 1/2007 | Megiddo et al. | |
| 7,203,671 | B1 * | 4/2007 | Wong ................................ | 1/1 |
| 7,225,195 | B2 | 5/2007 | Avrahami et al. | |
| 7,233,952 | B1 | 6/2007 | Chen | |
| 7,530,018 | B2 * | 5/2009 | Bischoff ........................ | 715/255 |
| 7,774,692 | B2 * | 8/2010 | Hirose et al. .................. | 715/200 |
| 2002/0107859 | A1 * | 8/2002 | Tsuyuki ......................... | 707/100 |
| 2004/0064786 | A1 * | 4/2004 | Ikeda et al. .................... | 715/500 |
| 2004/0117379 | A1 | 6/2004 | Khatchatrian et al. | |
| 2004/0181518 | A1 | 9/2004 | Mayo et al. | |
| 2005/0108271 | A1 * | 5/2005 | Hurmiz et al. ................ | 707/102 |
| 2005/0210389 | A1 | 9/2005 | Middelfart | |
| 2005/0283494 | A1 | 12/2005 | Colossi et al. | |
| 2006/0036581 | A1 * | 2/2006 | Chakrabarti et al. ............. | 707/3 |
| 2006/0143205 | A1 * | 6/2006 | Fuchs ............................ | 707/101 |
| 2007/0168231 | A1 * | 7/2007 | Sasai ................................ | 705/2 |
| 2007/0277122 | A1 * | 11/2007 | Frijlink et al. ................ | 715/854 |
| 2008/0208652 | A1 * | 8/2008 | Srivastava .......................... | 705/7 |

(Continued)

OTHER PUBLICATIONS

Golfarelli et al, Integrating XML Sources inot a Data Warehouse Environment, IEEE 2001, pp. 1-8.*

(Continued)

*Primary Examiner* — Cong-Lac Huynh

(57) ABSTRACT

Various technologies and techniques are disclosed for creating and managing a visual representation of OLAP attributes and relationships for a dimension. A visual representation is generated that contains an arrangement of shapes with connections between shapes. One or more sub-elements are contained within at least some of the shapes. Connections between the shapes represent relationships between attributes in an OLAP dimension. The containment of a respective sub-element within a respective shape represents a relationship between an attribute being represented by the respective sub-element and an attribute being represented by the respective shape. Shapes representing OLAP attributes and relationships can be programmatically grouped and ungrouped. When an attribute does not have any outgoing relationships, when an attribute only has one incoming relationship, and when the attribute is not a level in a user-defined hierarchy, a grouping process is performed to put the attribute in an expandable shape belonging to another attribute.

19 Claims, 19 Drawing Sheets

U.S. PATENT DOCUMENTS

2009/0006455 A1* 1/2009 Carroll .......................... 707/102
2009/0024658 A1* 1/2009 Khatchatrian et al. .... 707/103 Y

OTHER PUBLICATIONS

Yin et al., Elgebra-based Optimization of XML-Extended OLAP Querries, Google 2006, pp. 1-52.*

Hahn et al., Automatically Generatiing OLAP Schemata from Conceptual Graphic Models, ACM 2000, pp. 9-16.*

Hurtado et al., Updating OLAP Dimensions, ACM 1999, pp. 60-66.*

Hahn, et al., "Automatically Generating OLAP Schemata from Conceptual Graphical Models", Date: 2000, pp. 9-16, Proceedings of the 3rd ACM international workshop on Data warehousing and OLAP, ACM, New York, USA.

Malinowski et al., "OLAP Hierarchies: A Conceptual Perspective", Proceedings of the 3rd ACM International Workshop on Data Warehousing and OLAP, McLean, VA, USA, Nov. 6-11, 2000, 15 pages.

* cited by examiner

430

```
┌─────────────────────────────────────────────────────────────┐
│                                                             │
│   AFTER RELATIONSHIP DELETED, CONSIDER WHETHER              │
│   UNGROUPING OF RELATED ATTRIBUTE IS APPROPRIATE            │
│                          432                                │
│                                                             │
└─────────────────────────────────────────────────────────────┘
                               │
                               ▼
┌─────────────────────────────────────────────────────────────┐
│                                                             │
│   IF NEWLY UNGROUPED, NEW SHAPE IS SHOWN TO THE RIGHT       │
│          OF THE PREVIOUS GROUP LEADER                       │
│                          434                                │
│                                                             │
└─────────────────────────────────────────────────────────────┘
```

FIG. 13

VISUAL SYSTEM FOR VISUALIZING, NAVIGATING, AND EDITING ATTRIBUTE LATTICES WITHIN OLAP DATABASES

BACKGROUND

Online analytical processing (OLAP) databases are structured in a multidimensional data model, which is designed to allow complex analytical and ad-hoc queries to be executed. In order to generate a multidimensional data model, OLAP databases have various attributes and relationships that have numerous interdependencies between them. These interdependencies between attributes and relationships form a lattice of relationships for each dimension. The lattices of relationships can be quite complex to understand due to both the number of attributes, and the nature of the relationships between the attributes. In some instances, there may be one hundred or more attributes within a single dimension. The lattice of relationships does not always form a simple directed graph where there is a start point and one or more paths that flow in a chain. Instead, the lattice of relationships may produce diamond-shaped patterns, unevenly distributed chains of varying lengths, and also potential loops which form circular relationships. Thus, the very nature of attributes in OLAP databases makes their relationships complex to represent in a diagrammatic fashion.

SUMMARY

Various technologies and techniques are disclosed for creating and managing a visual representation of OLAP attributes and relationships for a dimension. A visual representation is generated that contains an arrangement of shapes with connections between the shapes. One or more sub-elements are contained within at least some of the shapes. Connections between the shapes represent relationships between attributes in an OLAP dimension. The containment of a respective sub-element within a respective shape represents a relationship between an attribute being represented by the respective sub-element and an attribute being represented by the respective shape.

In one implementation, shapes representing OLAP attributes and relationships are programmatically grouped and ungrouped. When an attribute does not have any outgoing relationships, when an attribute only has one incoming relationship, and when the attribute is not a level in a user-defined hierarchy, a grouping process is performed to put the attribute in an expandable shape belonging to another attribute in a visual representation of the OLAP attributes and relationships.

In one implementation, a visual representation of OLAP attributes and relationships is created for a dimension in a manner that depends on whether or not the visual representation has been previously created before. Input is received to access a visual representation of OLAP attributes and relationships for a dimension. When the visual representation for the OLAP attributes and relationships has not already been created for the dimension, a layout process is performed to create a layout for the visual representation. When the visual representation for the OLAP attributes and relationship has already been created for the dimension, then attributes from a prior display of the visual representation are retrieved and used to generate the visual representation.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 13 is a process flow diagram for one implementation illustrating the stages involved in deleting a relationship.

DETAILED DESCRIPTION

The technologies and techniques herein may be described in the general context as an OLAP visualization application, but the technologies and techniques also serve other purposes in addition to these. In one implementation, one or more of the techniques described herein can be implemented as features within a database program such as MICROSOFT® SQL Server™, or from any other type of program or service that provides visual representations of OLAP databases. In another implementation, one or more of the techniques described herein are implemented as features with other applications that deal with diagramming tools that interact with OLAP databases.

Figure 1:
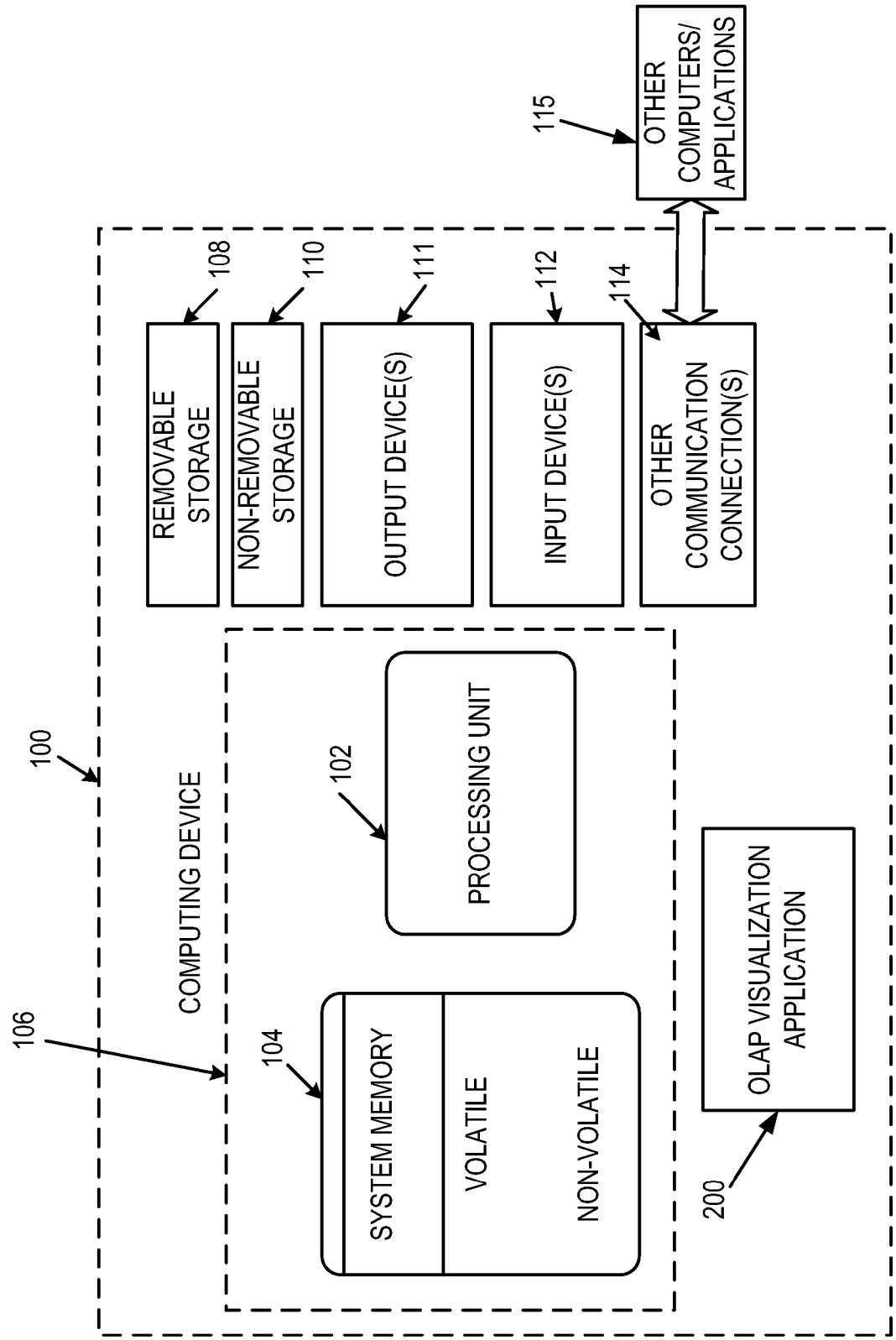
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here.

In one implementation, computing device 100 includes OLAP visualization application 200. OLAP visualization application 200 is responsible for generating a visual representation of shapes with connections between the shapes. Connections (such as lines) between the shapes represent relationships between attributes in an OLAP dimension. One or more sub-elements are contained within at least some of the shapes. The term "sub-element" as used herein is meant to include an attribute that is represented within a shape of another attribute. The containment of a respective sub-element within a respective shape represents a relationship between an attribute being represented by the respective sub-element and an attribute being represented by the respective shape. OLAP visualization application 200 will now be described in further detail in FIGS. 2-19 herein.

Figure 2:
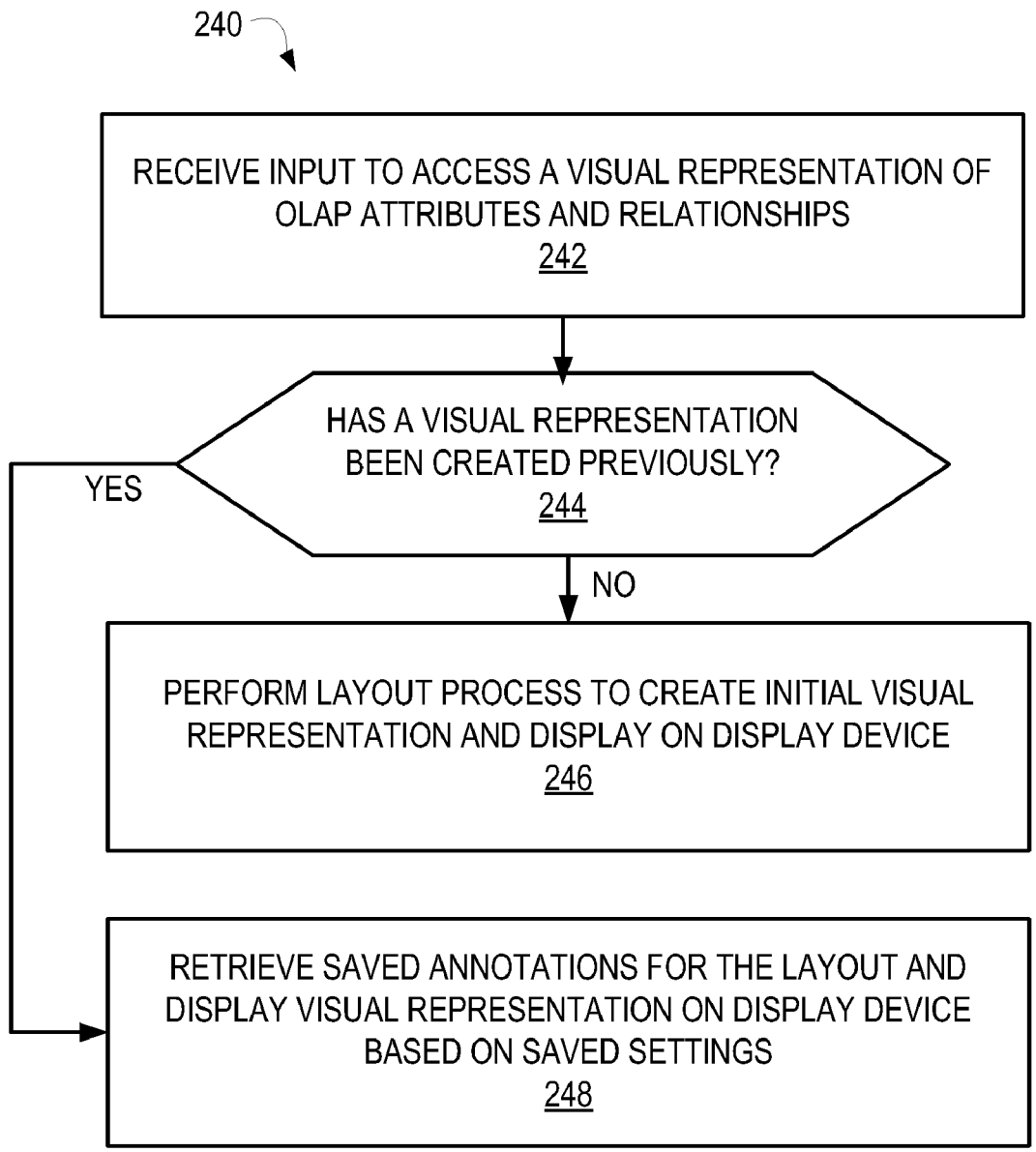
FIG. 2 is a process flow diagram for one implementation illustrating the high level stages involved in creating a visual representation of OLAP attributes and relationships for a dimension.

Turning now to FIGS. 2-19 with continued reference to FIGS. 1-2, the stages for implementing one or more implementations of OLAP visualization application 200 are described in further detail. In some implementations, the processes of FIG. 2-19 are at least partially implemented in the operating logic of computing device 100. FIG. 2 is a process flow diagram 240 for one implementation illustrating the high level stages involved in creating a visual representation of OLAP attributes and relationships for a dimension. Input is received from a user or programmatically to access a visual representation of OLAP attributes and relationships (stage 242). If a visual representation has not been created previously (decision point 244), then a layout process is performed to create an initial visual representation, and the visual representation is displayed on a display device or otherwise outputted (to a printer, file, etc.) (stage 246). If a visual representation has been created previously (decision point 244), then the saved annotations are retrieved for the layout, and the visual representation is displayed on a display device (or otherwise outputted) based on the saved settings (stage 248).

Figure 3:
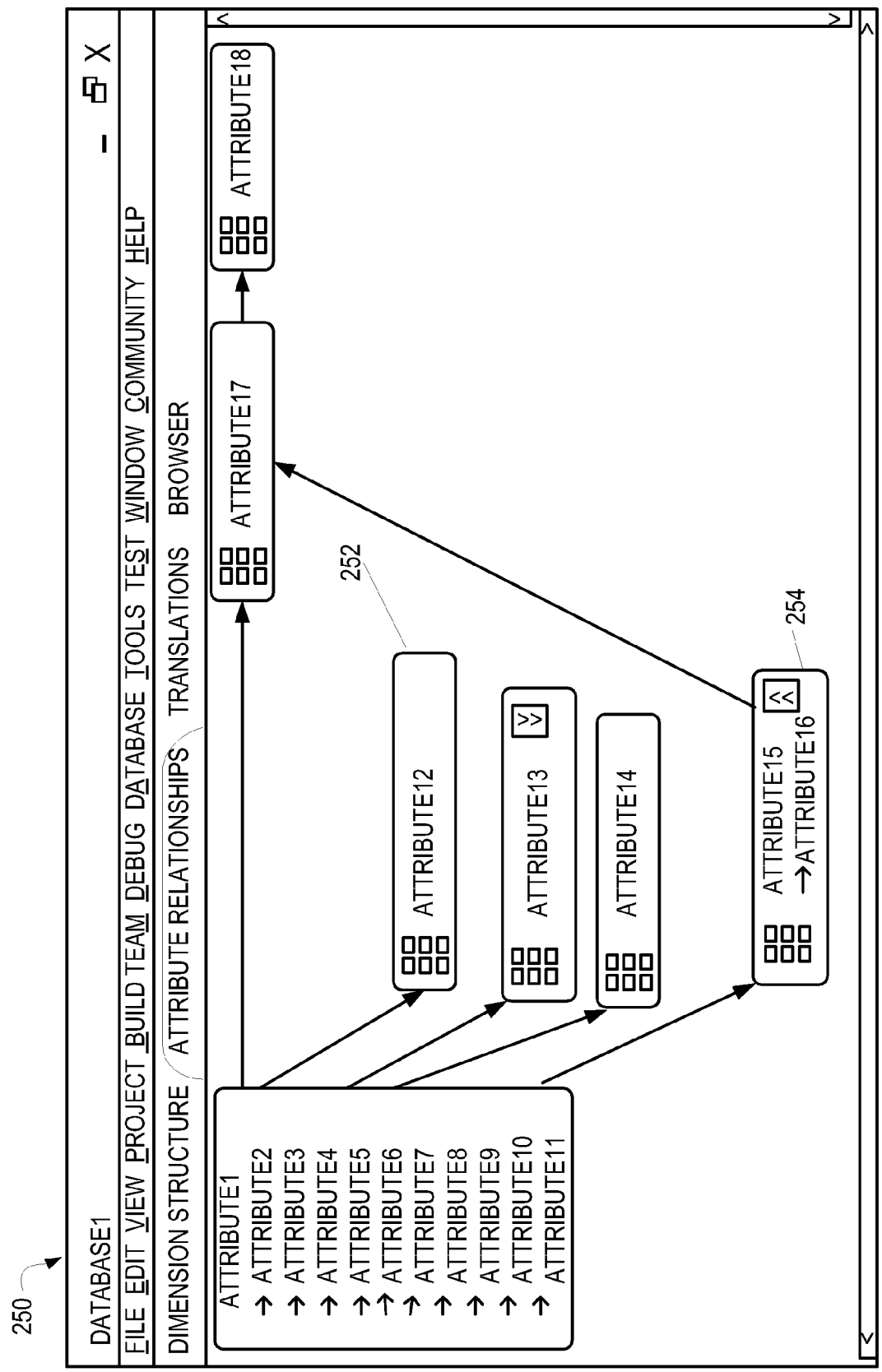
FIG. 3 is a simulated screen for one implementation illustrating a visual representation of attributes and attribute relationships.

FIG. 3 is a simulated screen 250 for one implementation illustrating a visual representation of attributes and attribute relationships. In the simulated screen 250 shown, multiple shapes (252 and 254) are shown in the visual representation. Lines are used to connect the shapes to each other and to illustrate the relationships between shapes. In the example shown, one of the shapes 254 is shown with a sub-element, which is another attribute that meets certain criteria (described in further detail in FIG. 7) for being represented within the shape of another attribute as opposed to being in a separate shape.

Figure 4:
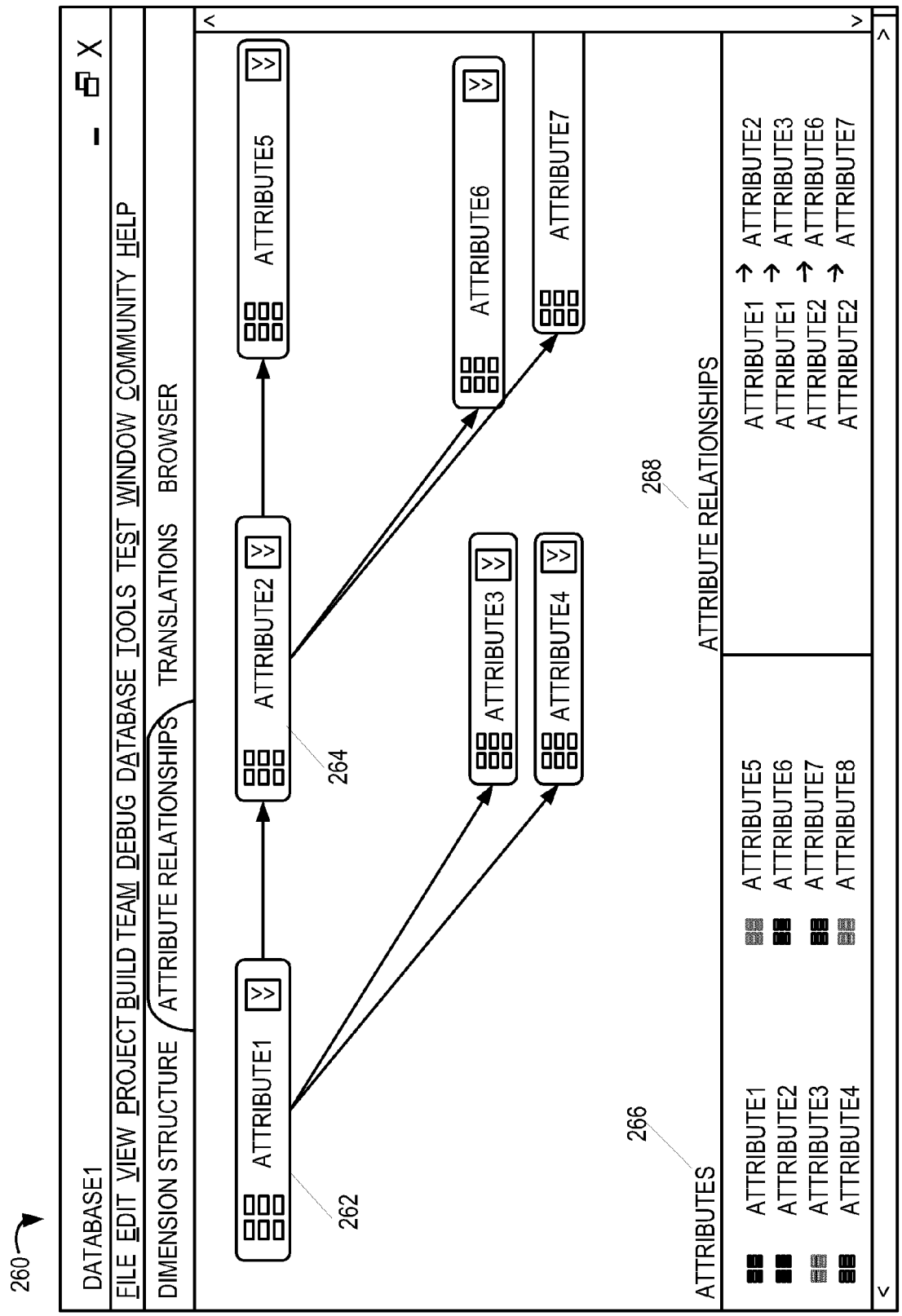
FIG. 4 is a simulated screen for one implementation illustrating a visual representation of attributes and attributes relationships for a more complex OLAP model.

Similarly, FIG. 4 is a simulated screen 260 for one implementation that illustrates a visual representation of attributes and attributes relationships for a more complex OLAP model. In the example visual representation shown in FIG. 4, there are various shapes (262, 264, etc.) that are shown in a collapsed state. The down arrows on each shape represent that the shape contains sub-elements (additional attributes). The example shown in FIG. 4 also contains a list of attributes 266 and a list of attribute relationships 268. These lists can be used to help navigate the visual representation that is shown above the lists in the example of FIG. 4, and/or for other purposes as described in further detail herein.

Figure 5:
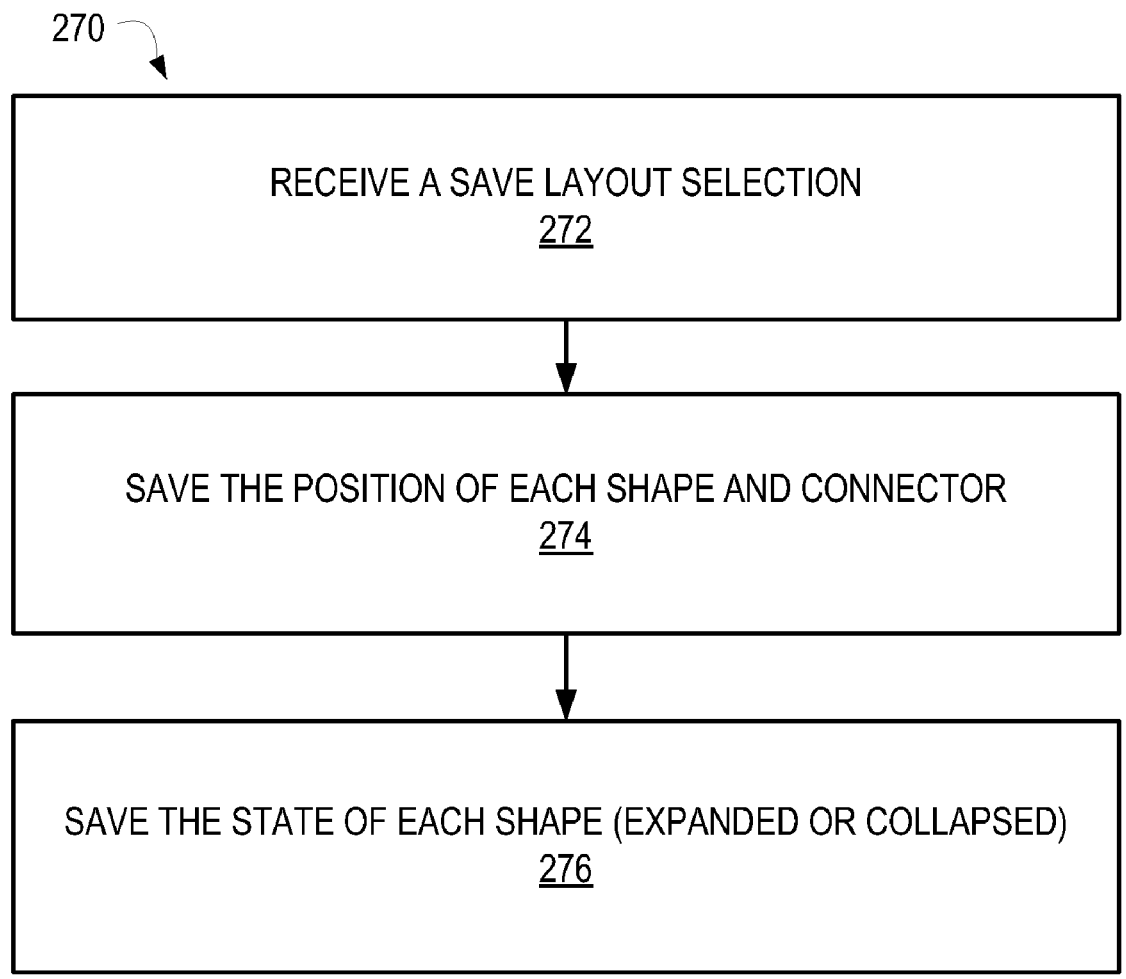
FIG. 5 is a process flow diagram for one implementation illustrating the stages involved in saving a layout of a visual representation of OLAP attributes and relationships for a dimension.

FIG. 5 is a process flow diagram 270 for one implementation illustrating the stages involved in saving a layout of a visual representation of OLAP attributes and relationships for a dimension. A save layout selection is received from a user or programmatically (stage 272). The positions of each shape and connector are saved into a data store (stage 274). The state of each shape (i.e. whether the shape is expanded or collapsed) is also saved (stage 276). These saved attributes are used as described previously in FIG. 2 for creating the layout of the visual representation.

Figure 6:
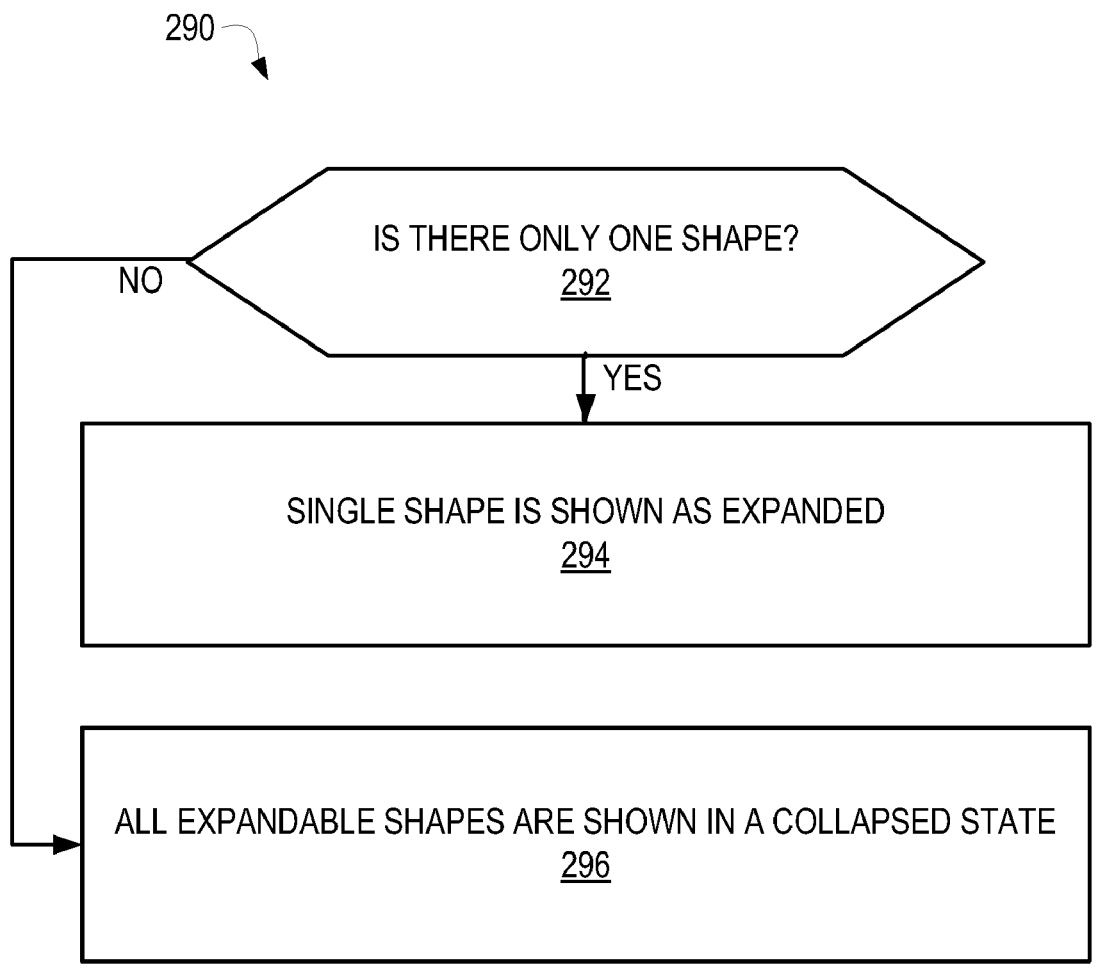
FIG. 6 is a process flow diagram for one implementation illustrating the stages involved in generating the default view of a visual representation of OLAP attributes and relationships for a dimension.

FIG. 6 is a process flow diagram 290 for one implementation illustrating the stages involved in generating a default view of a visual representation of OLAP attributes and relationships for a dimension. If there is only one shape for an attribute (decision point 292), then the single shape is shown as expanded (stage 294). If there is more than one shape (decision point 292), then all expandable shapes are shown in a collapsed state (stage 296).

Figure 7:
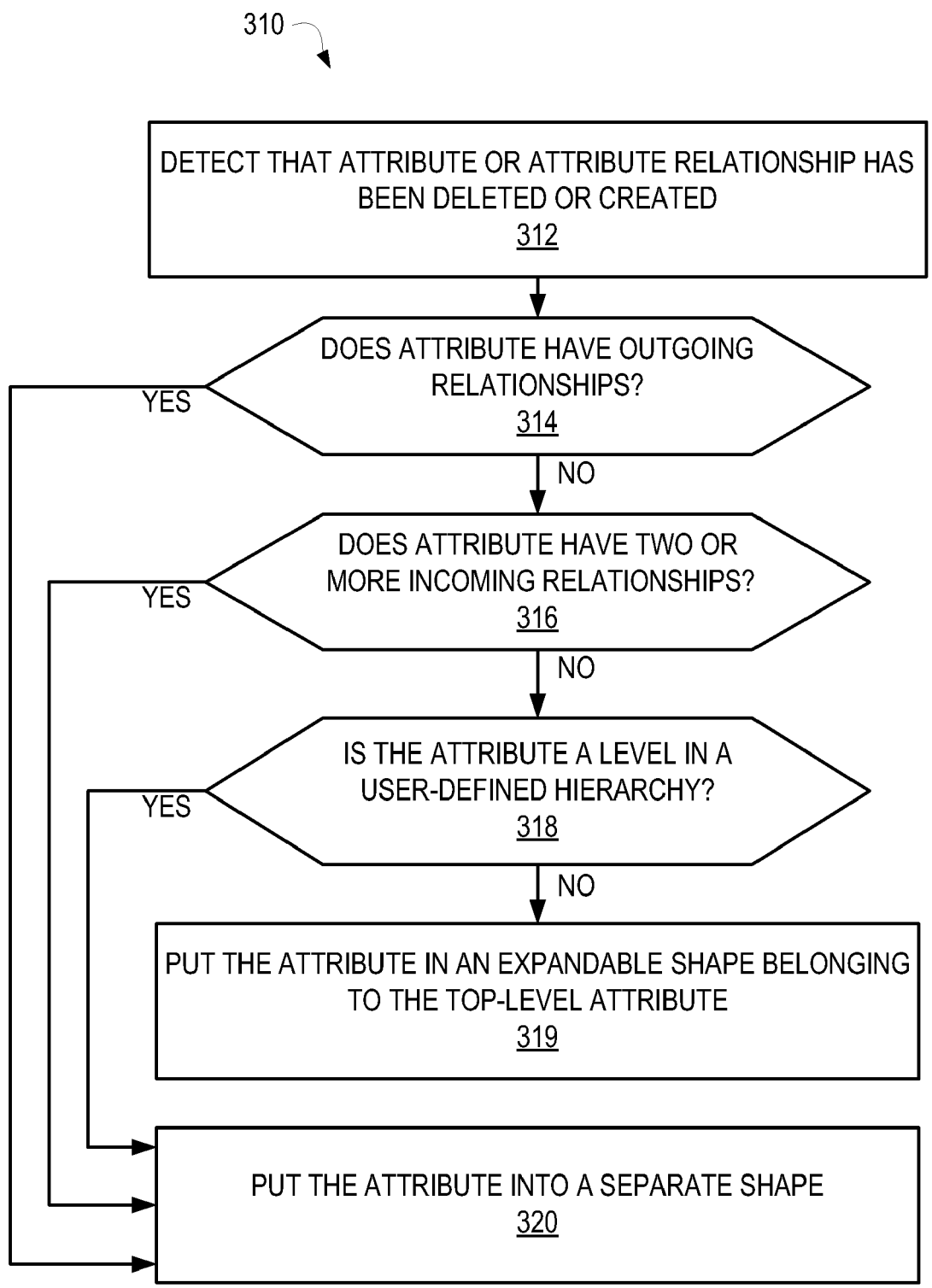
FIG. 7 is a process flow diagram for one implementation illustrating the stages involved in programmatically grouping and ungrouping shapes in the visual representation.

FIG. 7 is a process flow diagram 310 for one implementation illustrating the stages involved in programmatically grouping and ungrouping shapes in the visual representation. The system detects that attributes or attribute relationships have been deleted or created (stage 312). If the attribute does not have any outgoing relationships (decision point 314), if the attribute only has one incoming relationship (decision point 316), and if the attribute is not contained as a level in a user-defined hierarchy (decision point 318), then the system puts the attributes in an expandable shape belonging to a top-level attribute (i.e. another attribute to which the attribute is related) (stage 319). The term "user-defined hierarchy" as used herein is meant to include an arrangement of a set of attributes into a navigational hierarchy that is defined by the user designing the cube in order to simplify querying and browsing.

If the attribute has any outgoing relationships (decision point 314), then the attribute is put in a separate shape (stage 320). If the attribute has two or more incoming relationships (decision point 316), then the attribute is put in a separate shape (stage 320). If the attribute is contained as a level in a user-defined hierarchy, then the attribute is put in a separate shape (stage 320). The process described in FIG. 7 is just one implementation of the rules that can be used for determining how to group the attributes to reduce the number of shapes displayed on the visual representation. Other variations could also be used in alternate implementations, such as variations that include some, none, and/or additional rules than those described in FIG. 7. Some examples will now be shown in FIGS. 8 and 9 to further illustrate the concept of how this grouping of shapes works according to the exemplary process described in FIG. 7.

Figure 8:
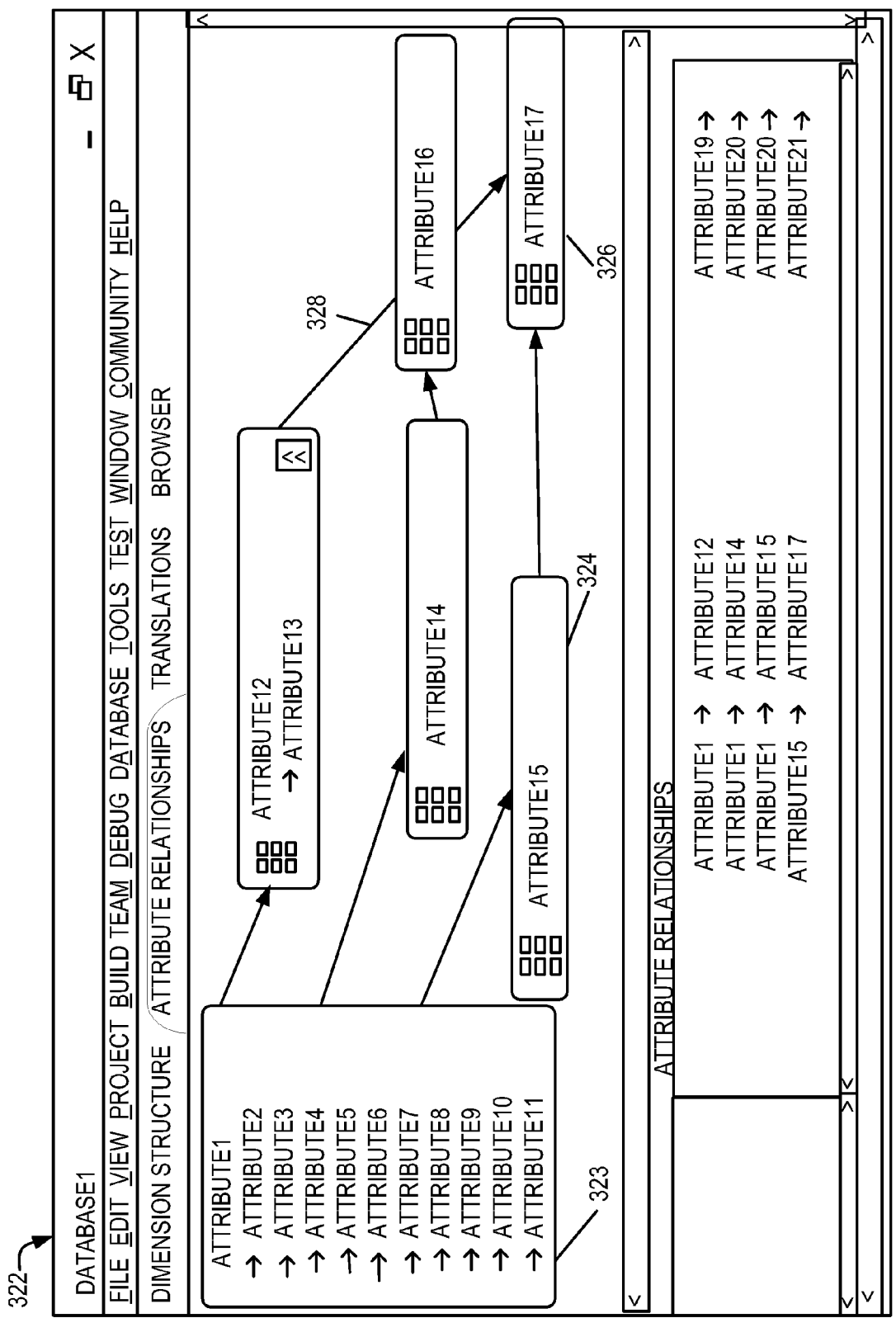
FIG. 8 is a simulated screen for one implementation illustrating how two attributes are separated from a larger grouping when relationships are established between them.
Figure 9:
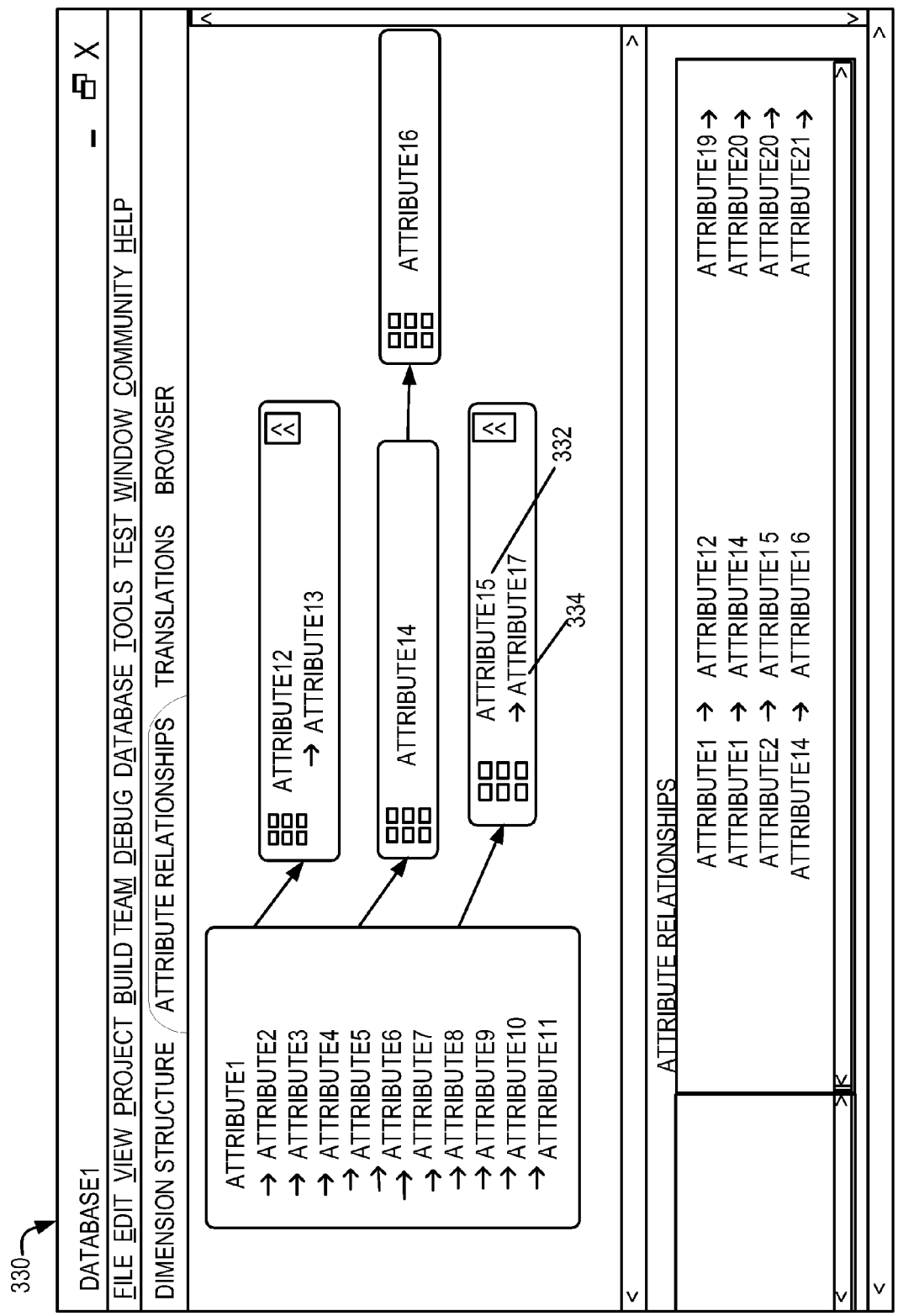
FIG. 9 is a simulated screen for one implementation illustrating two attributes being grouped together when an incoming relationship is deleted from one of the attributes.

FIG. 8 is a simulated screen 322 for one implementation illustrating how two attributes are separated from a larger grouping when relationships are established between them. In the example shown, an attribute named Attribute15 (324) and an attribute named Attribute17 (326) were separated out from a larger grouping of attributes 323 when a relationship was established between them. Then, as shown in simulated screen 330 of FIG. 9, the attributed named Attribute15 (332) and the attribute named Attribute17 (334) are grouped together when an incoming relationship (328 on FIG. 8) is deleted from the attribute named Attribute17 (334).

Figure 10:
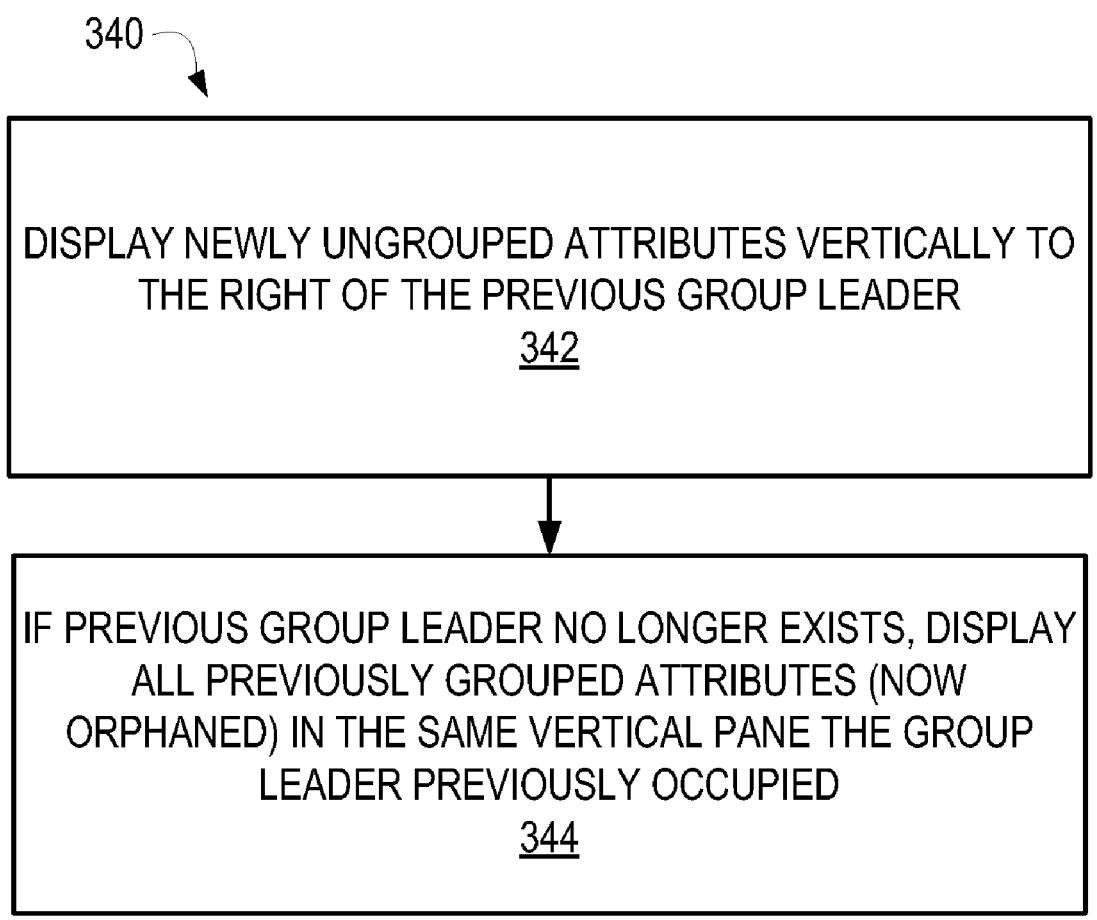
FIG. 10 is a process flow diagram for one implementation illustrating some layout considerations for attribute shapes based upon changes initiated within an OLAP visualization application.

Turning now to FIG. 10, a process flow diagram 340 for one implementation is shown that illustrates some layout considerations for attribute shapes based upon changes initiated within OLAP visualization application 200. Newly ungrouped attributes are displayed vertically to the right of the previous group leader (top-level attribute) (stage 342). If the previous group leader no longer exists, then previously grouped attributes (now orphaned) are displayed in the same vertical pane that the previous group leader occupied (stage 344).

Figure 11:
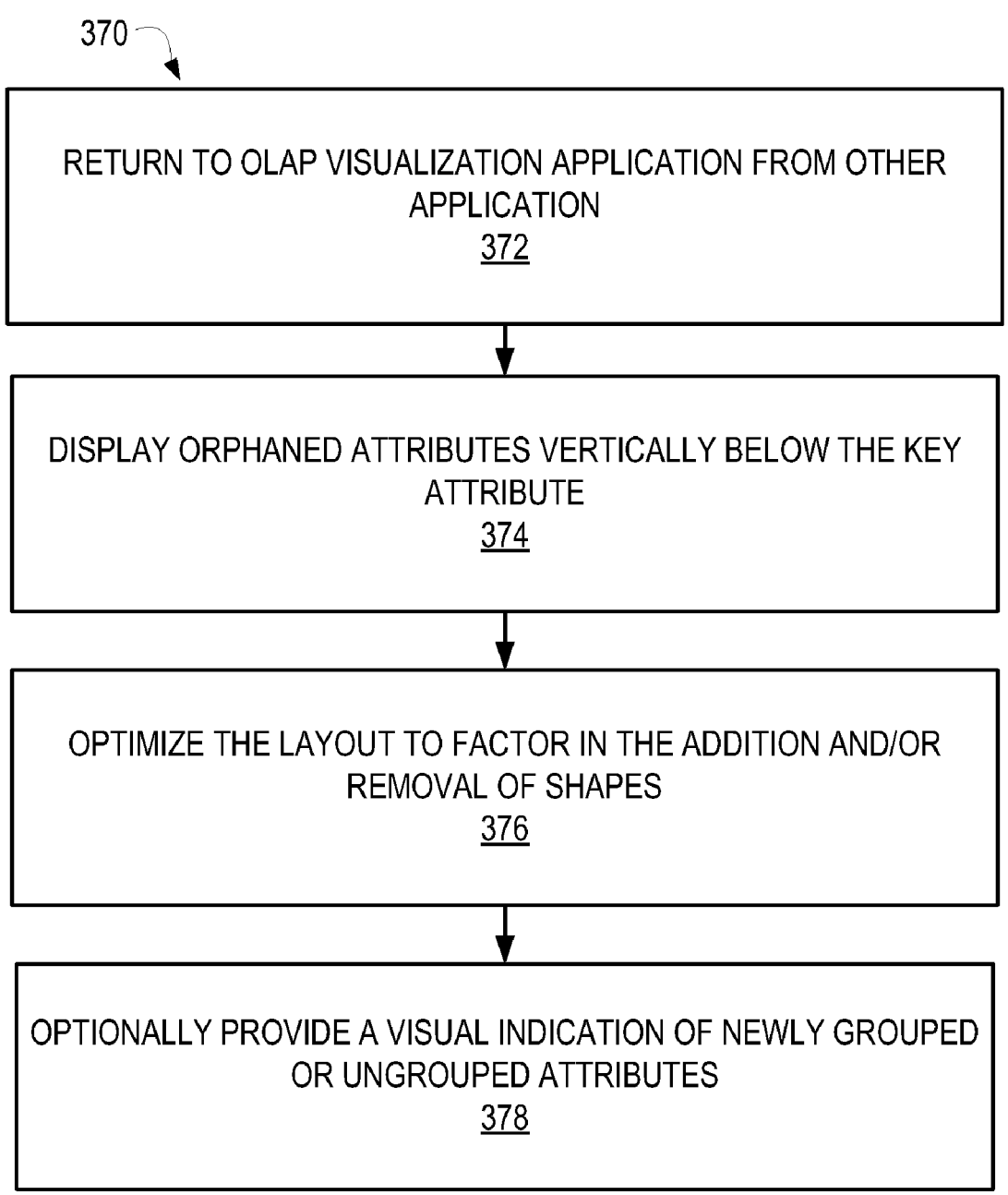
FIG. 11 is a process flow diagram for one implementation illustrating some layout considerations for attribute shapes based upon changes initiated outside an OLAP visualization application.

FIG. 11 is a process flow diagram 370 for one implementation illustrating some example layout considerations for attribute shapes based upon changes initiated outside OLAP visualization application 200. The OLAP visualization application 200 is opened/updated after changes have been made from another application to the OLAP attributes and/or relationships (stage 372). In one implementation, orphaned attributes are displayed vertically below the key attribute (stage 374). Orphaned attributes are attributes that do not have any incoming relationships or any outgoing relationships. The layout is optimized to factor in the addition and/or removal of shapes (stage 376). Visual indications are optionally provided to show newly grouped or ungrouped attributes (stage 378).

Figure 12:
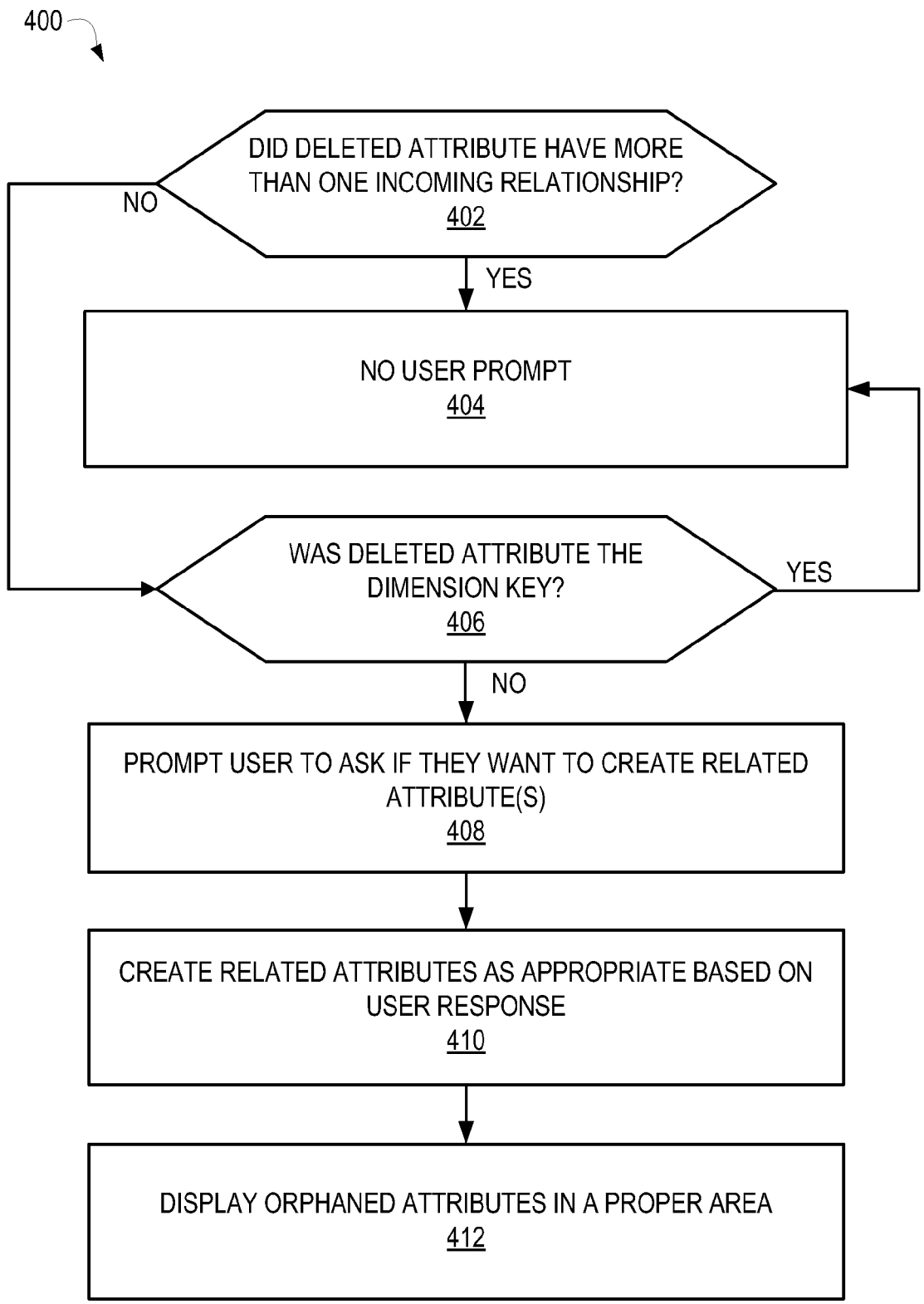
FIG. 12 is a process flow diagram for one implementation illustrating the stages involved in handling deletion of an attribute that would leave other attributes disconnected from the key attribute.

FIG. 12 is a process flow diagram 400 for one implementation illustrating some exemplary stages involved in handling the deletion of an attribute that would leave other attributes disconnected from the key attribute. If the deleted attribute had more than one incoming relationship (decision point 402), then no user prompt is given regarding the creation of additional attributes (stage 404). If the deleted attribute did not have more than one incoming relationship (decision point 402) and the deleted attribute was the dimension key (decision point 406), then the user is prompted to see if they want to create a relationship between other attributes that are related to the next available upstream attribute (stage 408). For example, if A is the dimension key in a series of relationships between A, B, and C, and then B is deleted, the user will be prompted to see if they want to create a relationship between A and C. Related attributes are then created as appropriate based on user response (stage 410). After the deletion of related attributes, any orphaned attributes are then displayed in a proper area of the display device (sage 412), such as in a dedicated orphaned window area. Other variations for prompting the user regarding creation options can also be used in alternate implementations.

FIG. 13 is a process flow diagram 430 for one implementation illustrating the stages involved in deleting a relationship. After a particular relationship has been deleted, OLAP visualization application 200 considers whether ungrouping of the related attribute is appropriate (stage 432). In one implementation, if the attribute is newly ungrouped, then the new shape representing the ungrouped attribute is shown to the right of the previous group leader (stage 434).

Figure 14:
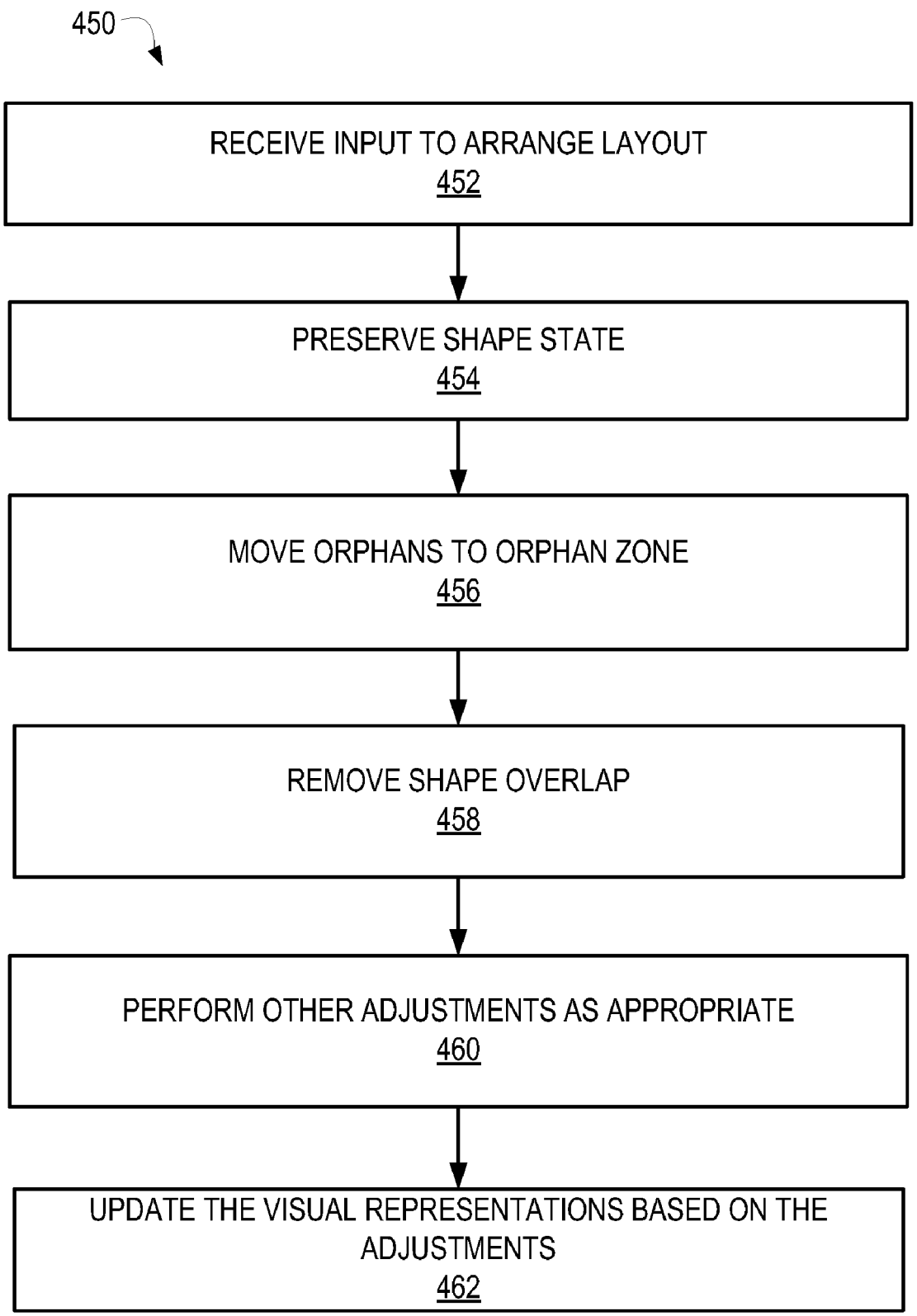
FIG. 14 is a process flow diagram for one implementation illustrating the stages involved in arranging the visual representation.

FIG. 14 is a process flow diagram 450 for one implementation illustrating the stages involved in arranging the visual representation. The system receives input to arrange a layout (stage 452), such as upon a user request or programmatically. The state (expanded or collapsed) of each of the shapes is preserved (stage 454). In one implementation, any orphans are moved to the orphan zone (stage 456). Any shape overlap is removed so the shapes do not touch each other (stage 458). Other adjustments can be performed to layout as appropriate, such as others that make the arrangement look better (stage 460). The visual representation of the attributes and their relationships is then updated on the display device (or otherwise) based on the adjustments (stage 462).

Figure 15:
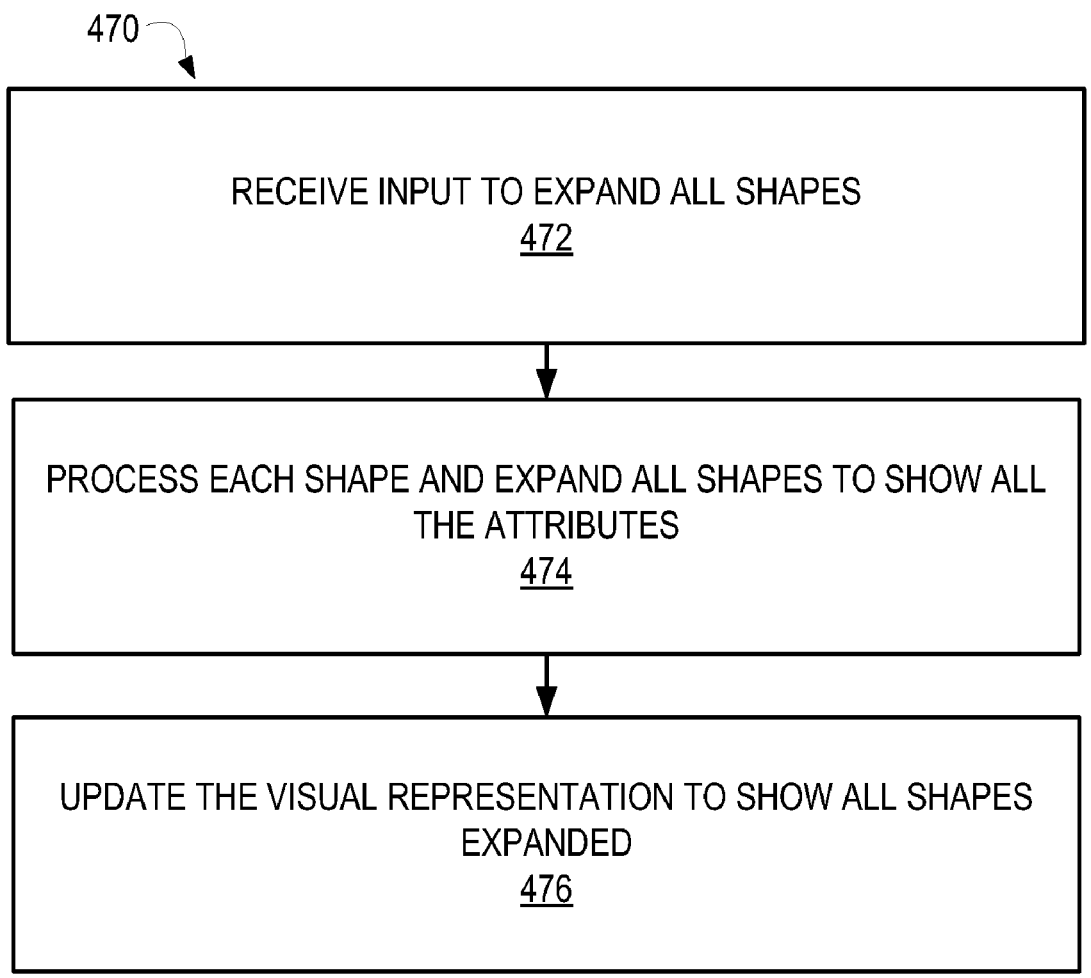
FIG. 15 is a process flow diagram for one implementation illustrating the stages involved in expanding all shapes in the visual representation.

FIG. 15 is a process flow diagram 470 for one implementation illustrating the stages involved in expanding all shapes in the visual representation. The system receives input to expand all shapes (stage 472), such as upon user selection or programmatically. Each shape is processed to expand the shapes so all the attributes are showing (stage 474). The visual representation is then updated to show all shapes as expanded (stage 476), although not all of the shapes may fit on a viewing window of the output device at the same time due to the size of the shapes after expansion. Some exemplary screens that illustrate the expansion of shapes will now be described in FIGS. 16 and 17.

Figure 16:
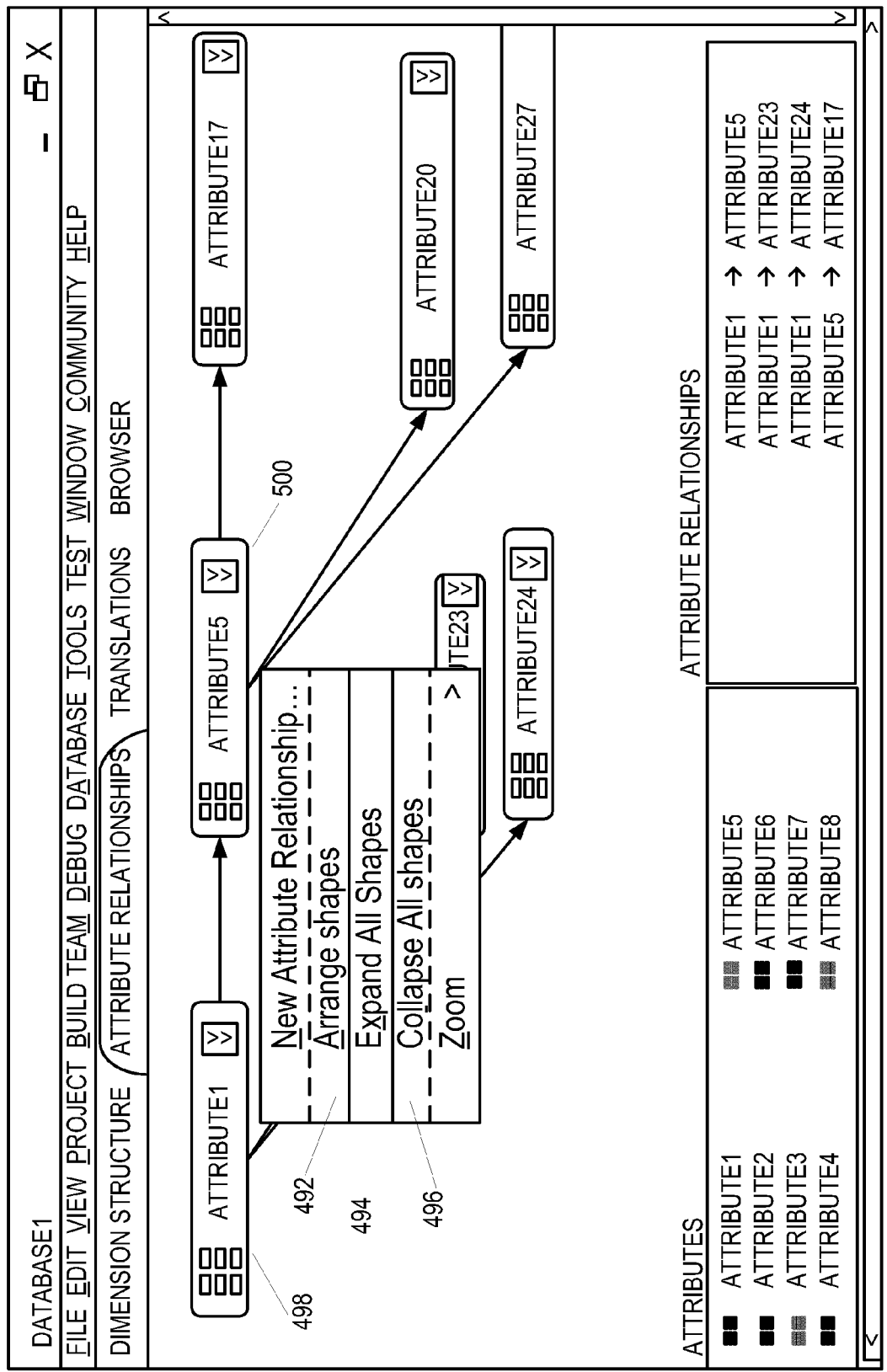
FIG. 16 is a simulated screen for one implementation illustrating an option that will expand all shapes.
Figure 17:
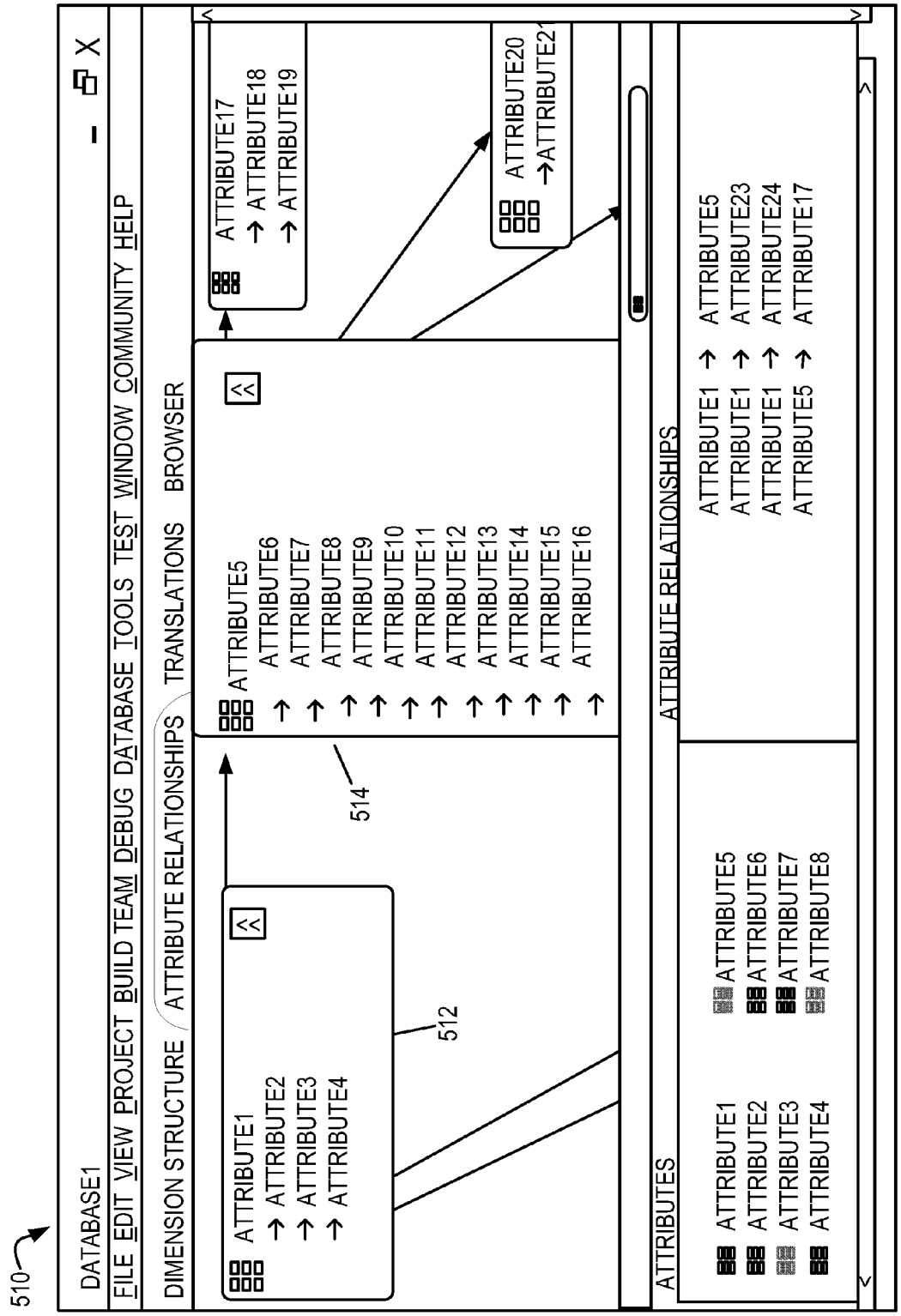
FIG. 17 is a simulated screen for one implementation illustrating how the visual representation changes with all shapes expanded.

FIG. 16 is a simulated screen 490 for one implementation illustrating an option that will expand all shapes 494, as well as an option for arranging shapes 492 and collapsing all shapes 496. Numerous shapes in FIG. 16 are shown in a collapsed state, such as shapes 498 and 500. Upon selection of the option to expand all shapes 494, a simulated screen 510 similar to FIG. 17 is then shown with the shapes (512 and 514 as well as others) now being in an expanded state.

Figure 18:
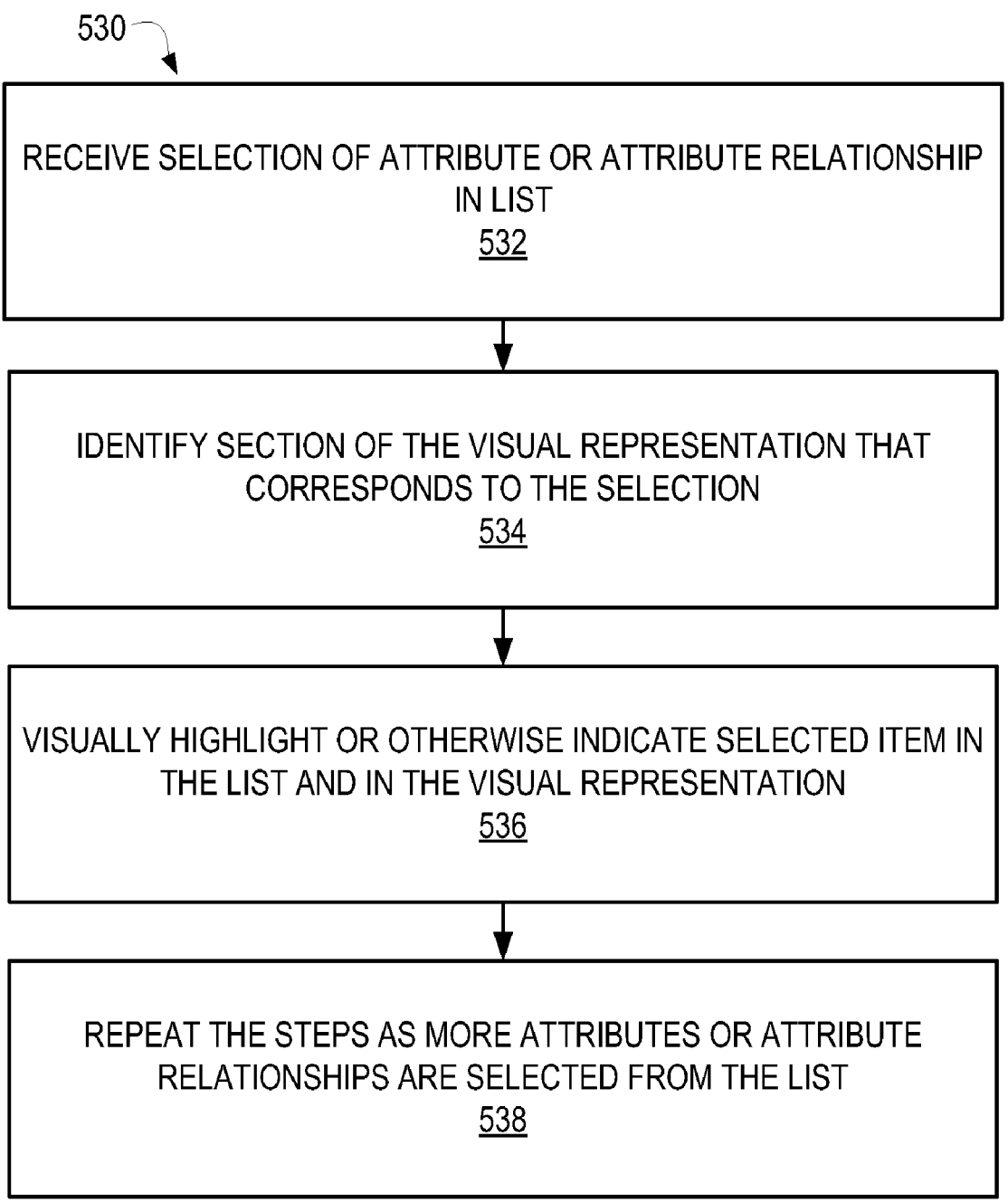
FIG. 18 is a process flow diagram for one implementation illustrating the stages involved in causing selections in the attribute or attribute relationship lists to be visually indicated in the corresponding visual representation.
Figure 19:
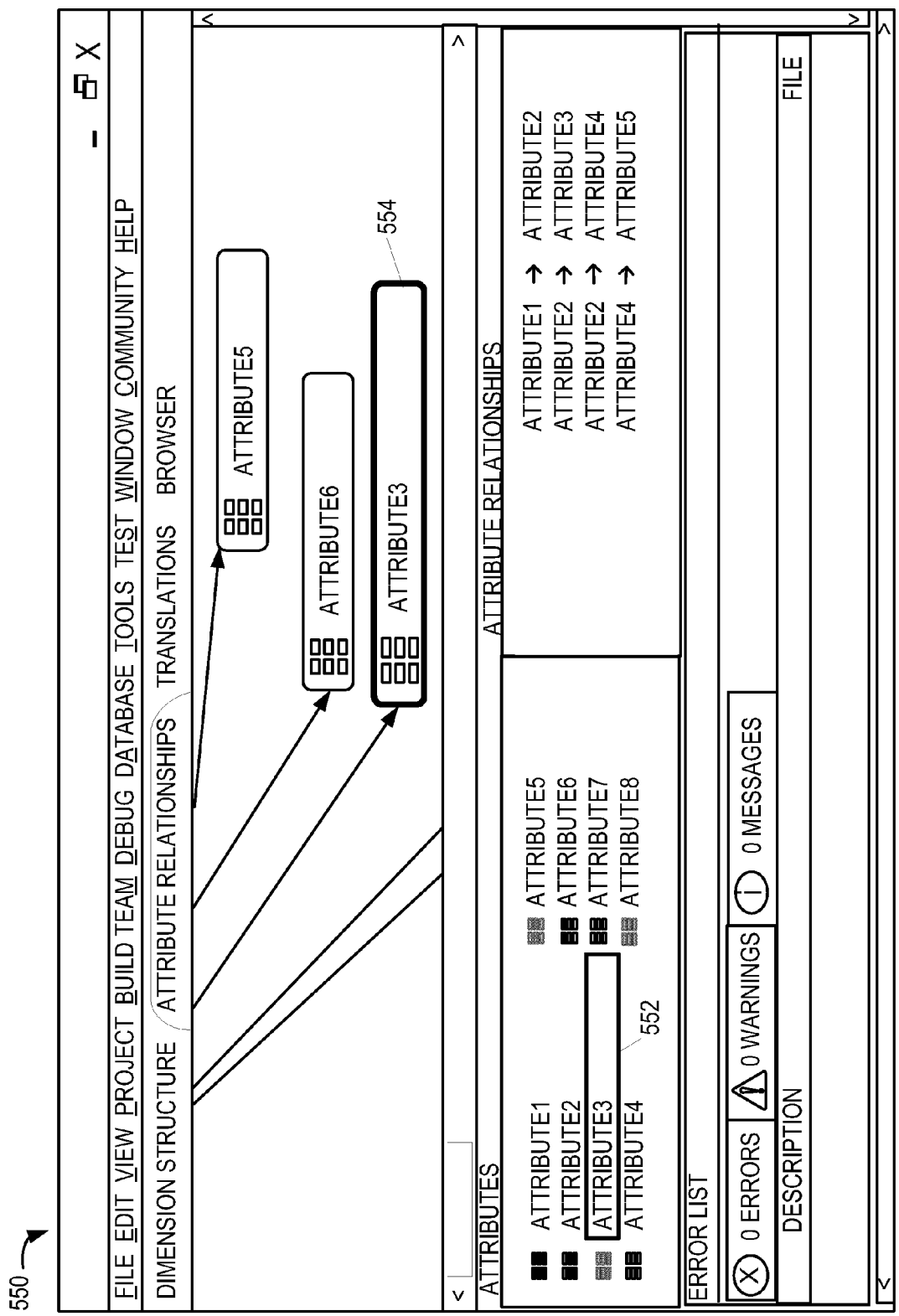
FIG. 19 is a simulated screen for one implementation illustrating how a selected attribute in the attribute list causes a corresponding section on the corresponding visual representation to be highlighted.

FIG. 18 is a process flow diagram 530 for one implementation illustrating the stages involved in causing selections in the attribute or attribute relationship lists to be visually indicated in the corresponding visual representation. When an attribute or attributes relationship is selected from the respective list (stage 532), a section of the visual representation that corresponds to the selection is identified (stage 534). The corresponding section on the visual representation is then visually highlighted or otherwise indicated (stage 536). An example of the visual representation being highlighted to correspond to a selection in the attribute list is shown in the simulated screen 550 of FIG. 19. The Attribute3 text attribute 552 that is selected in the attribute list is highlighted, as is the Attribute3 graphical attribute 554 in the visual relationship. This visual representation of shapes in the visual representation to correspond with selections in the attribute or attribute relationship lists help facilitate the navigation of complex relationships more quickly and more easily. The steps are repeated as more attributes or attribute relationships are selected from the list (stage 538).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A method for creating a visual representation of OLAP attributes and relationships for a dimension comprising the steps of:
    generating a visual representation that contains an arrangement of shapes with connections between the shapes, with one or more sub-elements contained within at least some of the shapes, with the connections between the shapes representing relationships between attributes in an OLAP dimension, and with the containment of a respective sub-element within a respective shape representing a relationship between an attribute being represented by the respective sub-element and an attribute being represented by the respective shape;
    displaying a textual list of attributes that corresponds to the attributes shown in the visual representation; and
    when a respective attribute is selected in the textual list, visually indicating a corresponding attribute on the visual representation.

2. The method of claim 1, further having computer-executable instructions for causing a computer to perform steps comprising:
    displaying the visual representation on a display device.

3. The method of claim 2, wherein the shapes are initially displayed in a collapsed state when the visual representation is displayed on the display device.

4. The method of claim 1, further having computer-executable instructions for causing a computer to perform steps comprising:
    receiving a save layout selection;
    saving a position of each of the shapes and connections; and
    saving a state of each shape.

5. The method of claim 4, wherein the save layout selection is received from a user.

6. The method of claim 4, wherein the save layout selection is received programmatically.

7. The method of claim 1, further comprising the steps of:
    receiving a selection to arrange a layout of the visual representation.

8. The method of claim 7, further comprising the steps of:
    preserving a state of each of the shapes; and
    removing any shape overlap between the shapes.

9. The method of claim 8, further comprising the steps of:
    moving any orphaned shapes to an orphan zone.

10. The method of claim 8, further comprising the steps of:
    updating the visual representation.

11. The method of claim 1, further comprising the steps of:
    receiving a selection to expand the visual representation;
    processing each of the shapes and expanding the shapes to show all of the attributes; and
    updating the visual representation to show all shapes in an expanded state.

12. The method of claim 1, further comprising the steps of:
    receiving a selection to collapse the visual representation;
    processing each of the shapes and collapsing the shapes to hide any attributes that are sub-elements; and
    updating the visual representation to show all shapes in a collapsed state.

13. A method for programmatically grouping and ungrouping shapes in a visual representation of OLAP attributes and relationships comprising the steps of:
    when an attribute does not have any outgoing relationships, when an attribute only has one incoming relationship, and when the attribute is not a level in a user-defined hierarchy, performing a grouping process to put the attribute in an expandable shape belonging to another attribute in a visual representation of OLAP attributes and relationships.

14. The method of claim 13, further comprising the steps of:
    when an outgoing relationship is added for the attribute, performing an ungrouping process to put the attribute in a separate shape.

15. The method of claim 13, further comprising the steps of:
    when two or more incoming relationships are present for the attribute, performing an ungrouping process to put the attribute in a separate shape.

16. The method of claim 13, further comprising the steps of:
    when the attribute becomes the level in the user-defined hierarchy, performing an ungrouping process to put the attribute in a separate shape.

17. A computer-readable medium having computer-executable instructions for causing a computer to perform steps comprising:
    receiving input to access a visual representation of OLAP attributes and relationships for a dimension;
    when the visual representation for the OLAP attributes and relationships has not already been created for the dimension, performing a layout process to create a layout for the visual representation, the layout process comprising the steps of:
    generating the visual representation in the layout that contains an arrangement of shapes with connections between the shapes, with one or more sub-elements contained within at least some of the shapes, with the connections between the shapes representing relationships between the OLAP attributes in the dimension, and with the containment of a respective sub-element within a respective shape representing a relationship between an attribute being represented by the respective sub-element and an attribute being represented by the respective shape;

receiving a selection to expand the visual representation;

processing each of the shapes and expanding the shapes to show all of the attributes; and updating the visual representation to show all shapes in an expanded state.

18. The computer-readable medium of claim 17, further having computer-executable instructions operable to perform steps comprising:

when the visual representation for OLAP attributes and relationships has already been created for the dimension, retrieving annotations that were saved a previous time that the visual representation was displayed, the annotations representing settings necessary to re-construct the layout.

19. The computer-readable medium of claim 17, further having computer-executable instructions operable to perform steps comprising:

displaying the visual representation on a display device.

* * * * *